United States Patent
Honas

[11] 3,833,148
[45] Sept. 3, 1974

[54] BREAD DISPENSER

[75] Inventor: Norbert W. Honas, Ellis, Kans.

[73] Assignee: The Raymond Lee Organization, Inc., New York, N.Y. ; a part interest

[22] Filed: Apr. 9, 1973

[21] Appl. No.: 349,216

[52] U.S. Cl.................. 221/250, 221/260, 221/276
[51] Int. Cl............................................. B65g 59/06
[58] Field of Search ........... 221/250, 264, 268, 232, 221/276, 260

[56] References Cited
UNITED STATES PATENTS
| | | | |
|---|---|---|---|
| 1,335,716 | 3/1920 | Watt | 221/250 X |
| 1,703,710 | 2/1929 | Cove | 221/268 X |
| 2,211,349 | 8/1940 | Nye | 221/250 X |
| 2,413,454 | 12/1946 | Kidwell | 221/264 X |
| 3,578,207 | 5/1971 | Danow | 221/232 |

Primary Examiner—Robert B. Reeves
Assistant Examiner—Francis J. Bartuska
Attorney, Agent, or Firm—Howard I. Podell

[57] ABSTRACT

A bread storage and dispensing unit for feeding one slice of bread at a time from a stored vertical stack of sliced bread inside the dispenser. A conveyor unit in the form of a series of rollers pushes against the rear of the bottom slice of bread to push that slice out through a slot in the side of the housing while simultaneously the rollers of the dispensing arm support the stored slices above the slice being dispensed.

1 Claim, 4 Drawing Figures

PATENTED SEP 3 1974　　　　　　　　　　　　3,833,148

BREAD DISPENSER

SUMMARY OF THE INVENTION

This invention relates to a dispenser unit for storing and dispensing one slice at a time, of bread from a sliced loaf.

The advantage of this device is that a loaf of sliced bread may be stored in the dispensing unit, and one slice, at a time, may be released as desired, by manual operation of an attached handle.

The device is in the form of a rectangular shaped housing of a size to store a loaf of sliced bread in vertical orientation. A removable cover in the top of the unit permits replacing of the loaf of sliced bread in the housing. The bottom most slice in the device rests adjacent to a slot in the side of the housing. A conveyor unit, linked to a protruding handle, is in the form of a series of linked rollers and is located so that one end of the conveying unit rests adjacent to the rear of the bottom most slice of the stack. Manual operation of the handle moves the conveying unit and the adjacent slice of bread towards the slot in the side of the housing so that the bottom-most slice of bread is ejected while the rollers of the conveyor unit support the remainder of the slices of bread in the stack. Retraction of the handle permits the next bottom-most slice of bread to drop to the bottom of the housing.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
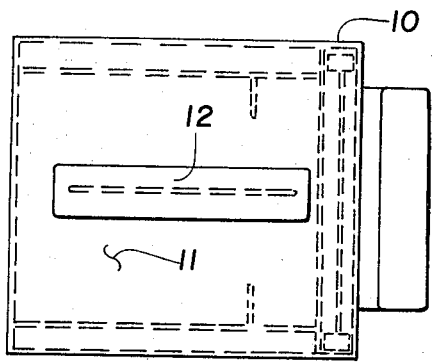
FIG. 1 is a plan view of the device.
Figure 2:
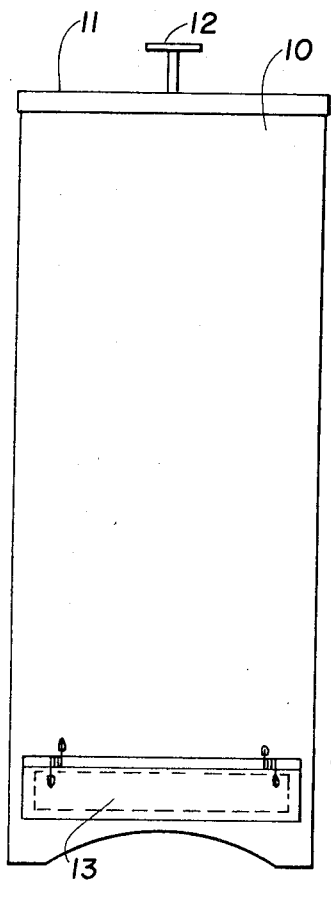
FIG. 2 is a front view of the device.
Figure 3:
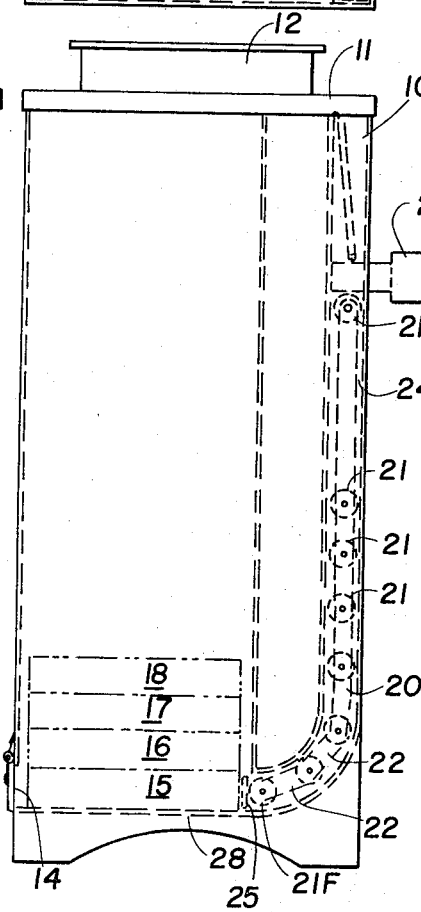
FIG. 3 is a side sectional view of the device.
Figure 4:
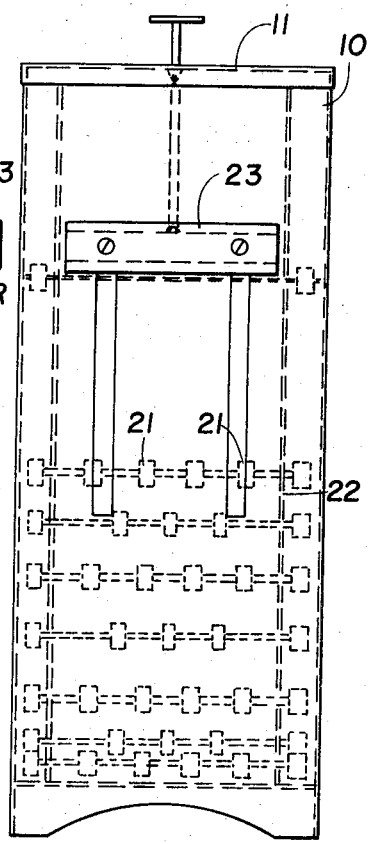
FIG. 4 is a rear sectional view of the device.

Turning now descriptively to the drawings, in which similar reference characters denote similar elements throughout the several views, FIG. 1-4 illustrate the dispenser and storage unit 10. The dispenser 10 is in the form of a housing of rectangular cross-section with a removable top 11 which permit adding a loaf of sliced bread or a series of bread slices 15, 16, 17 and 18 into the interior of the device so that each slice rests upon the slice below it, with the bottom most slice 15 rests upon the floor 28 of the device.

A handle 12 is attached to the top 11 for ease of handling.

A slot 14 adjacent to the location to the bottommost slice 15 in the unit is located in the front of the housing, said slot 14 being of the size to permit ejection of a complete slice of bread through the side of the housing, with slot 14 being enclosed normally by a hinged door 13.

Door 13 opens when the bottommost slice of bread 15 is pushed out through slot 14 by the conveyor unit 20.

Conveyor unit 20 consists of a series of rollers 21 which are joined together by chain links 22 and housed in a shaped recess 24. Handle 23 is attached to the rearmost roller 21R, with handle 23 mounted so as to be free to be moved in the vertical direction so as to move conveyor 20 towards slot 14, when it is desired to eject the bottommost slice 15 of bread from the dispenser. An end plate 25 is mounted to the front of the foremost roller 21F so that plate 25 lies parallel to the rear end of the bottommost slice 15. The width of plate 25 and the diameters of the rollers 21 are of the approximate thickness of a slice of bread 15. In use, handle 23 is manually pushed downwards, when it is desired to dispense the bottommost slice 15 of bread in the dispenser unit 10. Downward motion of handle 23 moves attached conveyor 20 and conveyor plate 25 against the bottommost slice 15 of bread in the dispenser and pushes slice 15 against hinge door 13. Hinge door 13 opens under the pressure of the bread slice 15 so as to permit the bottommost slice 15 to be dispensed from the unit under continued pressure from handle 13 transmitted through link 22 and back plate 25 against the slice 15. The conveyor 20 moves, in response to manual pressure against handle 23, towards the slot 14. The rollers 21 roll against the underside of the slice 16 of bread located above the bottommost slice 15 being dispensed, so as to support the entire stack of bread without damaging slice 15 or slice 16 by the sliding action of the conveyor.

Upom completely dispensing the bottommost slice of bread 15 through slot 14 and open hinged door 13, the conveyor 20 is retracted by upward vertical motion of the handle 23, and the conveyor rolls against the slice 16 under the conveyor to return completely into its shaped recess 24. Slice 16 then falls to rest on the floor 28 of dispensing device and may be next dispensed in turn.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A dispensing device for feeding one slice of bread at a time from a sliced loaf, with said sliced loaf being stored inside the dispensing device, comprising a housing with an internal recess of a size and shape to store a stack of slices of bread with each slice of bread resting upon a slice below it and with the bottommost slice of bread resting upon the floor of the housing of the device, said housing having a slot of a size and shape to permit sliding of the bottommost slice of bread through the slot when it is dispensed, together with a conveyor unit which is formed of a series of rollers rotatably joined to each other by links, said conveyor unit being joined at one end to a handle which protrudes through the housing of the device so that it may be manually operated to linearly move the conveyor unit, with said conveyor unit located so that the free end of the conveyor unit lies adjacent to the side of the bottommost slice of bread resting in the dispenser and opposite the side of the slice of bread located adjacent to the slot in the housing of the device, such that movement of the conveyor unit against the side of the slice of bread forces the slice of bread out of the unit through the open slot, with the remaining slices of bread being supported by the rollers of the conveyor which rest against the bottom surface of the next lowest slice of bread in the dispenser, said conveyor unit lying in a channel of the housing parallel to the axis of the recess in which the bread slices are stored, the sides of said channel serving as guides to rotate the travel of the conveyor unit from a path parallel to the said axis to a path perpendicular to said axis, when the conveyor unit is moved so as to eject a slice of bread from the dispensing device, while supporting the remainder of the slices of the stack of bread stored in the recess of the device.

* * * * *